(12) United States Patent
Huijsmans et al.

(10) Patent No.: US 8,003,264 B2
(45) Date of Patent: Aug. 23, 2011

(54) PROCESS FOR GENERATING ELECTRICITY AND CONCENTRATED CARBON DIOXIDE

(75) Inventors: Jozef Peter Paul Huijsmans, Amsterdam (NL); Gerard Jan Kraaij, Oude Niedorp (NL)

(73) Assignee: Shell Oil Company, Houston, TX (US)

( * ) Notice: Subject to any disclaimer, the term of this patent is extended or adjusted under 35 U.S.C. 154(b) by 1112 days.

(21) Appl. No.: 10/542,154

(22) PCT Filed: Jan. 14, 2004

(86) PCT No.: PCT/EP2004/050016
§ 371 (c)(1),
(2), (4) Date: Dec. 16, 2005

(87) PCT Pub. No.: WO2004/064220
PCT Pub. Date: Jul. 29, 2004

(65) Prior Publication Data
US 2006/0159967 A1     Jul. 20, 2006

(30) Foreign Application Priority Data

Jan. 14, 2003 (EP) .................................... 03250229

(51) Int. Cl.
*H01M 8/14* (2006.01)
*H01M 8/04* (2006.01)
(52) U.S. Cl. ........ 429/408; 429/414; 429/415; 429/416; 429/417; 429/428; 429/443; 429/444
(58) Field of Classification Search .................. 429/408, 429/414–417, 428, 434, 443–444
See application file for complete search history.

(56) References Cited

U.S. PATENT DOCUMENTS

| 4,810,595 | A | * | 3/1989 | Kahara et al. | 429/16 |
| 4,917,971 | A | | 4/1990 | Farooque | 429/19 |
| 5,084,363 | A | | 1/1992 | Reiser | 429/19 |
| 5,134,043 | A | * | 7/1992 | Nakazawa | 429/16 |
| 5,175,061 | A | | 12/1992 | Hildebrandt et al. | 429/16 |
| 2002/0142208 | A1 | | 10/2002 | Keefer et al. | 429/34 |

FOREIGN PATENT DOCUMENTS

| EP | 0376219 B1 | 7/1990 |
| EP | 0418864 A2 | 3/1991 |
| WO | 02/065564 | 8/2002 |

OTHER PUBLICATIONS

International Search Report dated Jul. 22, 2004.

* cited by examiner

*Primary Examiner* — Patrick Joseph Ryan
*Assistant Examiner* — Ladan Mohaddes

(57) ABSTRACT

A process for the generation of electricity and the production of a concentrated carbon dioxide stream using a molten carbonate fuel cell. Anode off-gas is at least partly fed to a catalytic afterburner wherein it is oxidized with an oxidant consisting of part of the cathode off-gas and/or part of a molecular oxygen containing external oxidant stream, which external oxidant stream has at most 20% (v/v) nitrogen. The oxidized anode off-gas is brought into heat exchange contact with the remainder of the cathode off-gas and the remainder of the external oxidant stream to obtain cooled anode off-gas and a heated mixture of cathode off-gas and external oxidant which are fed to the cathode chamber as the cathode inlet gas. As soon as a set point in the carbon dioxide concentration at the cathode chamber outlet is reached, part of the cooled anode off-gas is withdrawn from the process.

14 Claims, 2 Drawing Sheets

PROCESS FOR GENERATING ELECTRICITY AND CONCENTRATED CARBON DIOXIDE

PRIORITY CLAIM

The present application claims priority on European Patent Application 03250229.6 filed 14 Jan. 2003.

FIELD OF THE INVENTION

The present invention relates to a process for the generation of electricity and the production of a concentrated carbon dioxide ($CO_2$) stream using a molten carbonate fuel cell (MCFC).

BACKGROUND OF THE INVENTION

Molten carbonate fuel cells comprise a plurality of fuel cell elements, each comprising an electrolyte layer sandwiched between an anode, layer and a cathode layer. The electrolyte layer is a porous layer soaked with molten carbonate. Charge transfer through the electrolyte layer from the cathode to the anode is done by carbonate ions.

Fuel gas which is reformed in the anode chamber or reformed fuel gas is fed to the anode chamber. If the fuel gas is methane, the following reforming reaction takes place:

$$CH_4 + H_2O \rightarrow CO + 3H_2 \quad (1)$$

Carbon dioxide and oxygen are fed to the cathode chamber. The cathode reaction in a molten carbonate fuel cell is:

$$4CO_2 + 2O_2 + 8e^- \rightarrow 4CO_3^{2-}; \quad (2)$$

and the anode reactions are:

$$3CO_3^{2-} + 3H_2 \rightarrow 3H_2O + 3CO_2 + 6e^- \quad (3)$$

$$CO_3^{2-} + CO \rightarrow 2CO_2 + 2e^- \quad (4)$$

The overall reaction is:

$$CH_4 + H_2O + 2O_2 \rightarrow 3H_2O + CO_2 \quad (5)$$

In a conventional operation of a MCFC, the anode off-gas is recycled, typically after combustion of the non-utilized hydrogen and carbon monoxide, to the cathode chamber to provide for the carbon dioxide needed at the cathode layer. Air is fed to the cathode chamber to provide for the oxygen needed. The exhaust gas of the system, i.e. the cathode off-gas, comprises diluted carbon dioxide, usually in a concentration of about 3-5% (v/v).

In order to minimize the amount of carbon dioxide emitted to the atmosphere, it is advantageous to operate a MCFC in such a way that the carbon dioxide produced is obtained in a concentrated form. Carbon dioxide in a highly concentrated form, typically above 80% (v/v), can be efficiently liquefied and subsequently used in enhanced oil recovery or the recovery of coal bed methane. Also for effective sequestration of carbon dioxide, a concentrated carbon dioxide stream is needed. Carbon dioxide concentrated to about 50% (v/v), can usefully be applied in the food and paper industry.

In EP 418 864 A, a process is described wherein carbon dioxide containing combustion exhaust gas is fed to the cathode chamber of a MCFC. A high-concentration carbon dioxide gas is recovered from the anode off-gas. In the process of EP 418 864 A, there is still a diluted carbon-dioxide containing gas stream emitted to the atmosphere, i.e. the cathode off-gas. Moreover, the anode off-gas from which carbon dioxide is to be recovered is diluted with nitrogen.

Therefore, there is a need in the art for processes wherein the carbon dioxide in the exhaust stream is present in a high concentration, preferably at a concentration above 80 volume %.

SUMMARY OF THE INVENTION

Accordingly, the present invention is directed to a process for the generation of electricity and the production of a concentrated carbon dioxide stream using a molten carbonate fuel cell, the fuel cell comprising an electrolyte sandwiched between an anode and a cathode, an anode chamber and a cathode chamber, wherein the process comprises:

feeding a fuel gas to the anode chamber and a cathode inlet gas comprising carbon dioxide and molecular oxygen to the cathode chamber;

producing electricity, an anode off-gas and a cathode off-gas via anode and cathode reactions;

feeding at least part of the anode off-gas to a catalytic afterburner wherein it is oxidized with an oxidant to obtain an oxidized anode off-gas;

recycling the remainder of the anode off-gas to the anode chamber; wherein the oxidant consists of part of the cathode off-gas and/or part of a molecular oxygen containing external oxidant stream, which external oxidant stream comprises at most 20% (v/v) nitrogen;

the oxidized anode off-gas is brought into heat-exchange contact with the remainder of the cathode off-gas and the remainder of the external oxidant stream to obtain cooled anode off-gas and a heated mixture of cathode off-gas and external oxidant;

the cathode off-gas is cooled before it is brought in heat-exchange contact with the oxidized anode off-gas;

the cooled anode off-gas and the heated mixture of cathode off-gas and external oxidant are fed to the cathode chamber as the cathode inlet gas;

as soon as a set point in the carbon dioxide concentration at the cathode chamber outlet is reached, part of the cooled anode off-gas is withdrawn from the process.

BRIEF DESCRIPTION OF THE DRAWINGS

The invention will be illustrated by means of schematic FIGS. 1 to 4.

DESCRIPTION OF THE INVENTION

Figure 1:
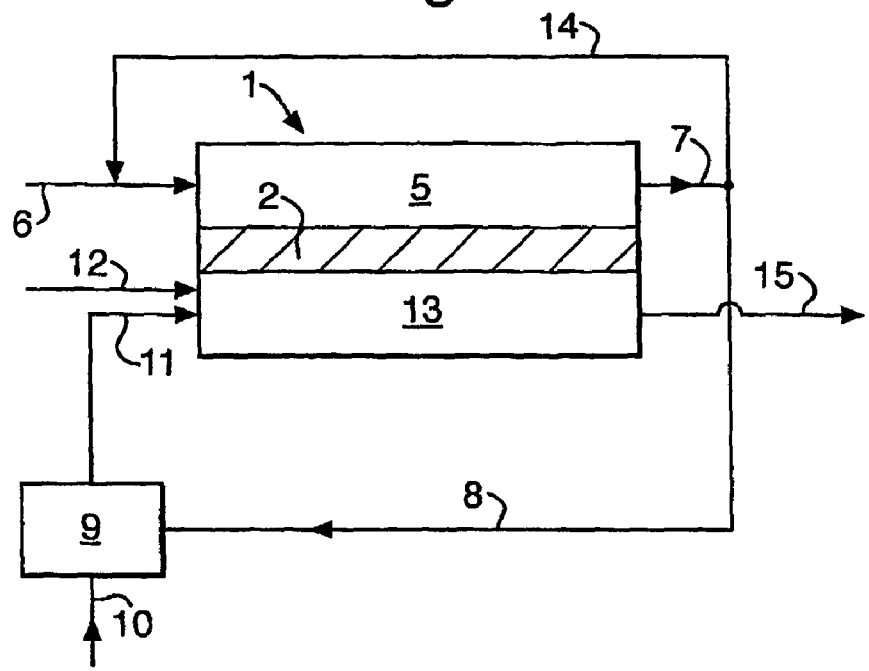
FIG. 1 shows a conventional process for operating a molten carbonate fuel cell.

In the process according to the invention, cathode off-gas which is diluted with a molecular oxygen containing external oxidant stream which comprises at most 20% (v/v) of nitrogen, and oxidised anode off-gas are fed to the cathode chamber. The anode off-gas is catalytically oxidised with relatively pure oxygen, i.e. cathode off-gas and/or the external oxidant stream. Thus, the amount of nitrogen or other inert gases in the system is minimised, resulting in an oxidised anode off-gas stream which contains mainly carbon dioxide and water. From this stream, highly concentrated carbon dioxide can easily be withdrawn after separation of the water from it, e.g. by condensation.

The external oxidant stream, which is used as oxidant in the catalytic afterburner and/or as oxidant for the cathode reaction, contains preferably at most 10% (v/v) nitrogen or other inert gases. The external oxidant stream may contain carbon dioxide. The carbon dioxide content of the external oxidant stream is not critical. The external oxidant stream preferably contains at least 70% (v/v) molecular oxygen, more preferably at least 80% (v/v). An external oxidant stream of substantially pure oxygen is most preferred. Such a stream may suitable be produced by techniques known in the art, for example by the removal of nitrogen from air by pressure swing absorption (PSA).

The amount of external molecular oxygen containing oxidant added to the process will be determined by the amount of oxygen needed to sustain the electrochemical reaction of the fuel cell and will thus depend on the oxygen concentration in the external oxidant stream.

The fuel gas fed to the anode chamber is preferably a gaseous hydrocarbon gas such as natural gas, methane, biogas, or land-fill gas that is reformed in the anode chamber. Reference to reforming is to the reaction of the fuel with steam to form carbon monoxide and hydrogen, such as given by equation (1) for methane. An advantage of reforming in the anode chamber or internal reforming is that the heat produced by the charge transfer in the electrolyte layer may can then be directly used for the endothermic reforming reaction. Reforming in the anode chamber is typically achieved by placing an additional Ni-containing reforming catalyst in the anode chamber.

If the fuel gas contains substantial amounts of $C_2^+$ hydrocarbons, it is preferred that the fuel is pre-reformed before entering the anode chamber. In that case, a hydrocarbonaceous fuel is converted by steam reforming into a carbon monoxide and hydrogen containing gas upstream of the anode chamber. The carbon monoxide and hydrogen containing gas is then fed to the anode chamber as fuel gas. Reforming upstream of the anode chamber may be performed inside or outside the fuel cell.

The steam needed for the reforming reaction may be provided by an external source, but is preferably provided by the anode off-gas. In that case, part of the anode off-gas is fed to the reformer or to the anode chamber if reforming takes place inside the anode chamber. Preferably, 35 to 90% (v/v) of the anode-off gas is recycled to the reformer or the anode chamber, more preferably 50 to 80% (v/v).

The fuel gas preferably contains less than 20% (v/v) of nitrogen or other inert gases, more preferably less than 10% (v/v). Most preferably, the fuel gas contains substantially no nitrogen. The fuel gas may contain a substantial amount of carbon dioxide, for example up to 70% (v/v).

The anode off-gas is at least partly fed to a catalytic afterburner. If not all of the anode off-gas is fed to the afterburner, the remainder is fed to the anode chamber either directly or indirectly via a steam reformer upstream and in fluid communication with the anode chamber for the purpose of providing the steam needed for the steam reforming reaction as explained hereinabove.

In the catalytic afterburner, the unconverted carbon monoxide and hydrogen in the anode off-gas are oxidized. The amount of oxidant fed to the catalytic afterburner is preferably the stoichiometric amount needed for oxidizing the hydrogen and carbon monoxide. Thus, an oxidized anode off-gas containing carbon dioxide, steam and substantially no oxygen is obtained. The oxidant used in the catalytic afterburner might be part of the cathode off-gas, part of the external oxidant stream comprising at most 20% v/v of nitrogen or a combination of both.

The oxidized anode off-gas is brought into heat exchange contact with the remainder of the cathode off-gas and the remainder of the external oxidant stream to obtain cooled anode off-gas and a heated mixture of cathode off-gas and external oxidant, which are both fed to the cathode chamber as the cathode inlet gas.

The heat exchange contact serves to bring the cathode inlet gas to the appropriate cathode inlet temperature.

In the process according to the invention, the cathode inlet gas will provide for cooling of the fuel cell, i.e. of the stack of fuel cell elements each containing an electrolyte layer sandwiched between an anode layer and a cathode layer. Therefore, the temperature of the cathode inlet gas will be lower than the temperature of the cathode off-gas. In order to maintain the cathode inlet gas at the appropriate cathode inlet temperature, the cathode off-gas is cooled before being brought in heat-exchange contact with the hot oxidized anode off-gas. In order to achieve cooling of the stack by the cathode inlet gas, it is preferred that the cathode inlet gas flow is higher than the flow that contains the stoichiometric amount of oxygen needed to maintain the electrochemical reaction. Preferably, the cathode flow is 3-6 times the stoichiometric flow.

Cooled anode off-gas and the heated mixture of cathode off-gas and external oxidant are fed to the cathode chamber until a set point in carbon dioxide concentration at the cathode chamber outlet is reached. As soon as the set point is reached, part of the cooled anode off-gas is withdrawn from the process. Preferably, the amount of withdrawn anode off-gas is such that the amount of carbon in the withdrawn gas is equal to the amount of carbon in the fuel gas fed to the anode chamber. In this way, the carbon dioxide concentration at the outlet of the cathode chamber is kept constant at the set point. It will be appreciated that the set point in carbon dioxide concentration at the cathode chamber outlet should be chosen such that the efficiency and life time requirements of the fuel cell are sufficiently met. Preferably, the set point is in the range of from 5 to 40% (v/v), more preferably of from 10 to 30% (v/v).

The withdrawn anode off-gas comprises mainly carbon dioxide and steam. If there was nitrogen present in the external oxidant stream or in the fuel gas fed to the anode chamber, the withdrawn anode off-gas will also comprise nitrogen. In the preferred case, wherein substantially pure oxygen is used as the external oxidant and nitrogen-free fuel gas is fed to the anode, the withdrawn anode off-gas consists substantially of carbon dioxide and steam.

A concentrated carbon dioxide stream may be obtained by further cooling the withdrawn anode off-gas to a temperature at which the steam condenses. Water may thus be easily separated from the withdrawn anode off-gas.

It will be appreciated that for start-up of the process according to the invention, fuel gas and external steam will be fed to the anode chamber and burned anode off-gas and oxygen will be fed to the cathode chamber.

In FIG. 1 is shown part of a molten carbonate fuel cell 1 comprising an element 2 of an electrolyte layer sandwiched between an anode layer and a cathode layer. Fuel gas is fed to anode chamber 5 via line 6. The anode off-gas is discharged from anode chamber 5 via line 7. The main part of the anode off-gas is led via line 8 to catalytic afterburner 9. Air is fed to catalytic after burner 9 via line 10. The remaining carbon monoxide and hydrogen in the anode off-gas is oxidized in catalytic afterburner 9. The oxidized anode off-gas and air are fed via lines 11 and 12, respectively, to cathode chamber 13. Part of the anode off-gas is recycled to anode chamber 5 via line 14. Cathode off-gas is discharged from cathode chamber 13 via line 15.

Figure 2:
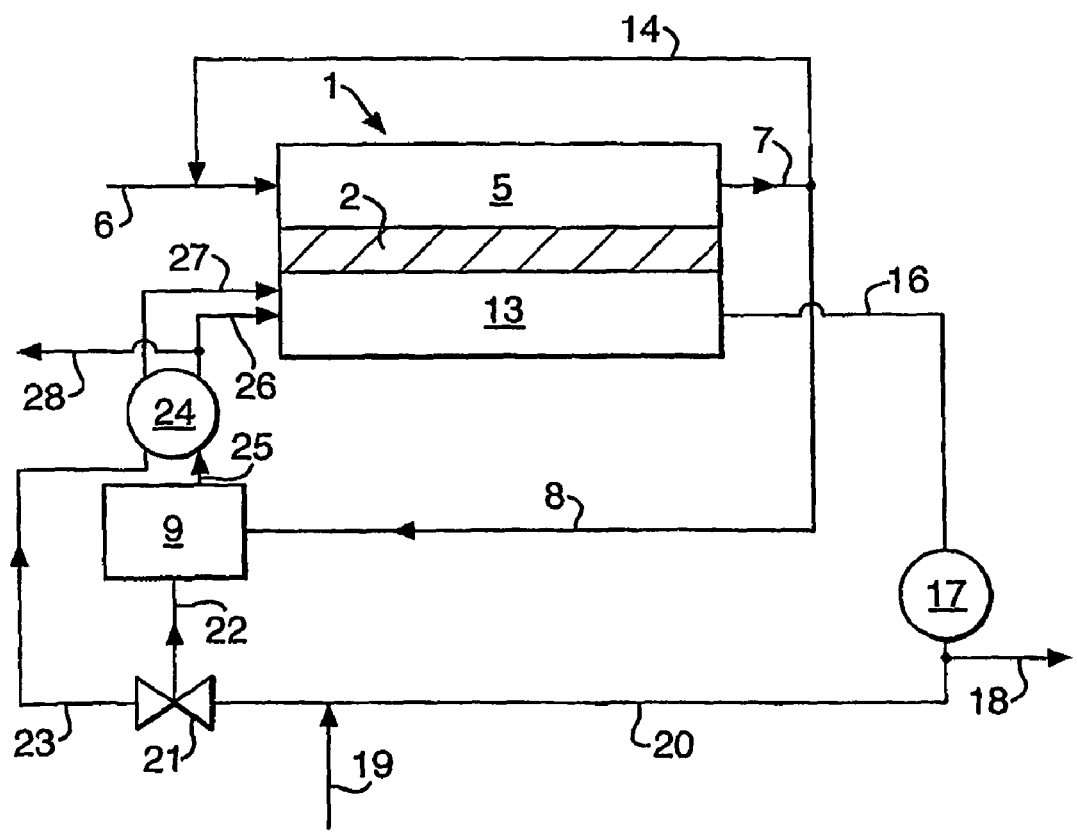
FIG. 2 shows a process according to the invention wherein a mixture of cathode off-gas and external oxidant is used as oxidant for the catalytic afterburner.

In FIG. 2 is shown part of a molten carbonate fuel cell 1 operated according to a process of the invention. The cathode off-gas is led via line 16 to heat exchanger 17, wherein it is cooled to ambient temperature. Water is thus condensed from the cathode off-gas and withdrawn via line 18. Substantially pure oxygen from a PSA unit (not shown) is fed via line 19 to the cooled cathode off-gas in line 20, thus obtaining a mixture of cathode off-gas and oxygen. The amount of the mixture to provide for the amount of oxygen needed for combustion of the unconverted carbon monoxide and hydrogen in the anode off-gas is fed via valve 21 and line 22 to catalytic afterburner 9. The remainder of the mixture is led via line 23 to heat exchanger 24. Oxidized anode off-gas is led via line 25 to heat exchanger 24. In heat exchanger 24, the hot oxidized anode off-gas heats the cold mixture of cathode off-gas and oxygen to the appropriate cathode inlet temperature. Cooled anode off-gas and heated mixture of cathode off-gas and oxygen are fed into cathode chamber 13 via lines 26 and 27, respectively. Part of the cooled anode off-gas is withdrawn from the process via line 28.

Figure 3:
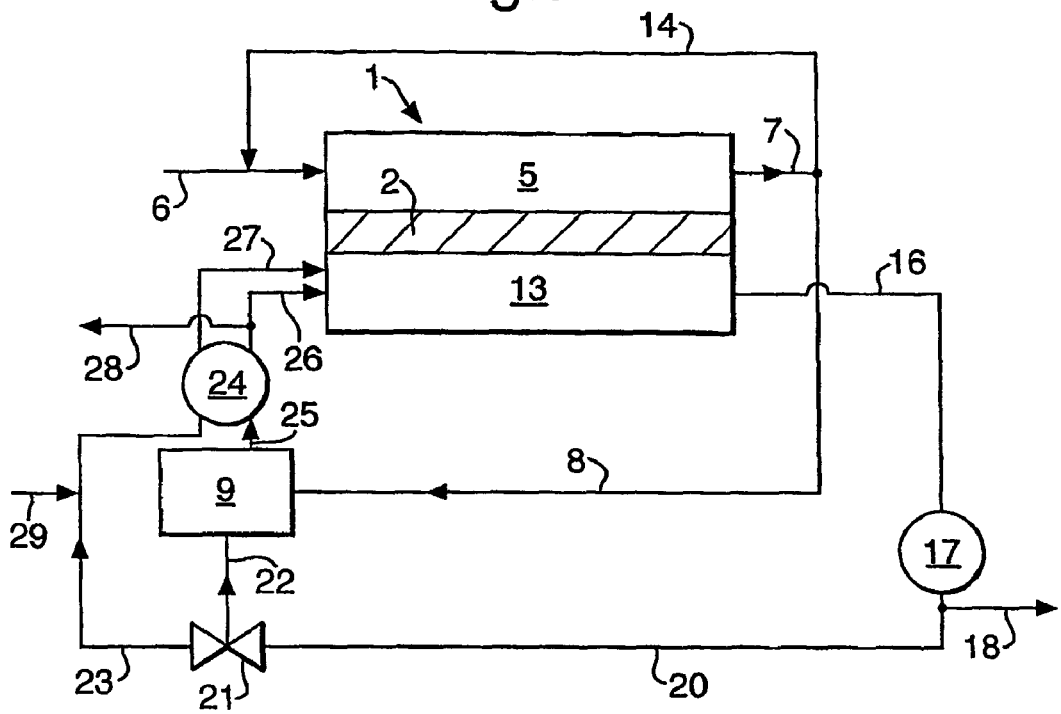
FIG. 3 shows a process according to the invention wherein only cathode off-gas is used as oxidant for the catalytic afterburner.

In FIG. 3 is shown part of a molten carbonate fuel cell 1 operated according to a process of the invention. The process is similar to that shown in FIG. 2, but now a substantially pure oxygen stream is fed to the cooled cathode off-gas in line 23. Thus, the external oxidant stream bypasses catalytic afterburner 9. The oxidant fed to catalytic afterburner 9 via line 22 is cathode off-gas only.

Figure 4:
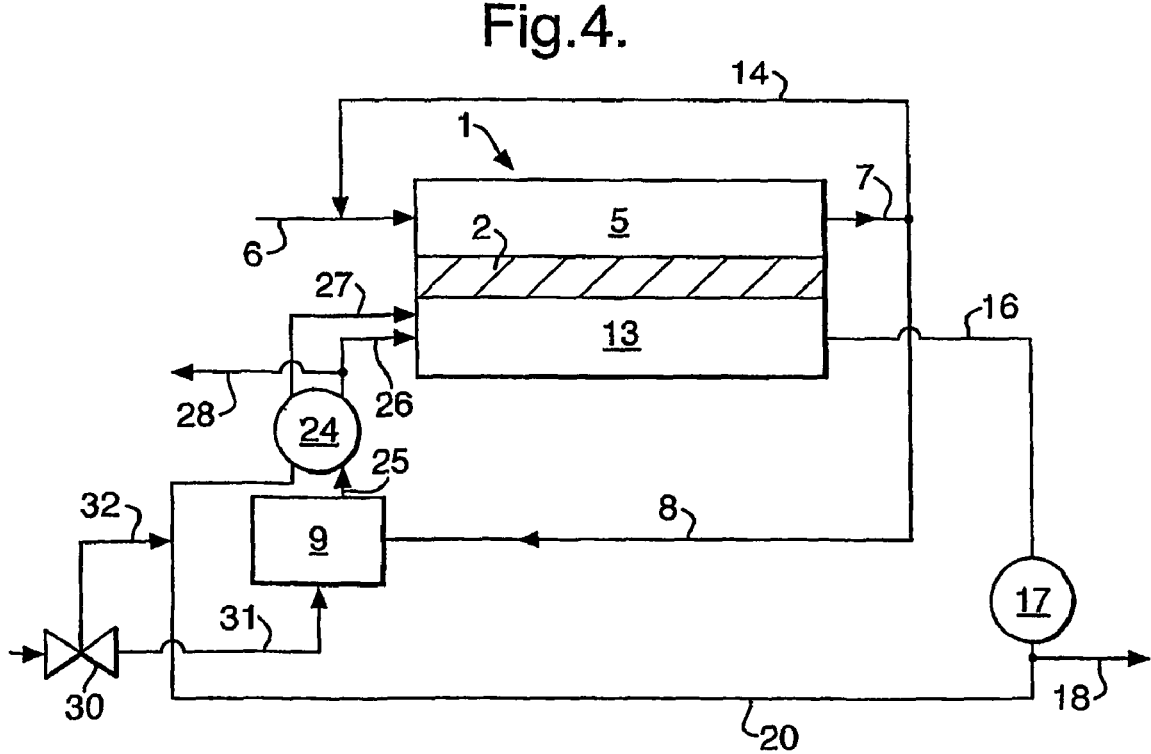
FIG. 4 shows a process according to the invention wherein only external oxidant is used as oxidant for the catalytic afterburner.

In FIG. 4 is shown part of a molten carbonate fuel cell 1 operated according to a process of the invention. The process is similar to that shown in FIGS. 2 and 3, but now all of the cooled cathode off-gas is led from heat exchanger 17 to heat exchanger 24 via line 20. The oxidant for catalytic afterburner 9 is substantially pure oxygen which is fed to afterburner 9 via valve 30 and line 31. The remainder of the substantially pure oxygen stream is fed to line 20 via line 32.

The invention will be further illustrated by means of the following non-limiting example.

EXAMPLE

In an on-stream process in a fuel cell system as shown in FIG. 2, 1.0 NL/s of fresh methane is supplied via line 6 to anode chamber 5 and a stream of 19.7 NL/s containing 64% (v/v) $O_2$, 29% (v/v) $CO_2$ and 7% (v/v) $O_2$ and having a temperature of 600° C. is supplied to cathode chamber 13 via lines 26 and 27. 25.6 NL/s anode off-gas having a temperature of 675° C. and containing 63% (v/v) $CO_2$, 27% (v/v) $H_2O$, 4% (v/v) $H_2$ and 5% (v/v) CO is discharged from anode chamber 5 via line 7. 19.2 NL/s of the anode off-gas is recycled to anode chamber 5 via line 14, 6.4 NL/s of the anode off-gas is fed to catalytic afterburner 9 via line 8. The anode inlet temperature is 600° C. A stream of 14.6 NL/s of cathode off-gas having a temperature of 675° C. and containing 75% (v/v) $O_2$, 15% (v/v) $CO_2$ and 10% (v/v) $H_2O$ is discharged from cathode chamber 13 via line 16 and cooled to room temperature in heat exchange 17. 1.5 NL/s of water is separated from the cathode off-gas via line 18. To the remaining 13.1 NL/s of cooled cathode off-gas, 2.0 NL/s of substantially pure oxygen is added via line 19. Of the resulting mixture that comprises 85% (v/v) $O_2$ and 15% (v/v) $CO_2$, 0.4 NL/s is supplied via line 22 to catalytic afterburner 9 as oxidant and 14.6 NL/s is led to heat exchanger 24 via line 23. In afterburner 9, the anode off-gas is oxidized to an oxidized anode off-gas containing 69% (v/v) $CO_2$ and 31% (v/v) $H_2O$. 1.5 NL/s of the oxidized anode off-gas is withdrawn from the system via line 28. The remainder of the oxidized anode off-gas and the heated oxidant make up the cathode inlet stream of 19.7 NL/s. Reference herein to NL/s is to liter at standard temperature and pressure conditions (STP; 0° C. and 1 atm.) per second.

We claim:

1. A process for the generation of electricity and the production of a concentrated carbon dioxide stream using a molten carbonate fuel cell, the fuel cell comprising an electrolyte sandwiched between an anode and a cathode, an anode chamber and a cathode chamber, wherein the process comprises:
   feeding a fuel gas to the anode chamber and a cathode inlet gas comprising carbon dioxide and a molecular oxygen to the cathode chamber;
   producing electricity, an anode off-gas and a cathode off-gas via anode and cathode reactions;
   feeding at least part of the anode off-gas to a catalytic afterburner wherein it is oxidized with an oxidant to obtain an oxidized anode off-gas;
   recycling the remainder of the anode off-gas to the anode chamber; wherein the oxidant consists of part of the cathode off-gas and/or part of a molecular oxygen containing external oxidant stream, which external oxidant stream comprises at most 20% (v/v) nitrogen;
   the oxidized anode off-gas is brought into heat-exchange contact with the remainder of the cathode off-gas and the remainder of the external oxidant stream to obtain a cooled anode off-gas and a heated mixture of cathode off-gas and external oxidant;
   the cathode off-gas is cooled before it is brought in heat-exchange contact with the oxidized anode off-gas;
   the cooled anode off-gas and the heated mixture of cathode off-gas and external oxidant are fed to the cathode chamber as cathode inlet gas;
   as soon as a set point in the carbon dioxide concentration at the cathode chamber outlet of in the range of from 5 to 40% (v/v) is reached, part of the cooled anode off-gas is withdrawn from the process, where it is processed to obtain a concentrated carbon dioxide stream.

2. The process of claim 1, wherein the withdrawn anode off-gas is further cooled to separate water from it and to obtain the concentrated carbon dioxide stream.

3. The process of claim 1, wherein the fuel gas is a hydrocarbonaceous gas, and wherein the fuel gas is converted into a carbon monoxide and hydrogen containing gas in the anode chamber.

4. The process of claim 3, wherein only part of the anode off-gas is fed to the catalytic afterburner and the remainder is recycled to the anode chamber.

5. The process of claim 3, wherein the fuel gas is selected from the group consisting of natural gas, methane, biogas, and land-fill gas.

6. The process of claim 1, wherein the fuel gas is a reformer effluent comprising hydrogen and carbon monoxide.

7. The process of claim 1, wherein the fuel gas contain at most 25% (v/v) nitrogen.

8. The process of claim 1, wherein 35% to 90% (v/v) of the anode off-gas is recycled to the anode chamber.

9. The process of claim 1, wherein 50% to 80% (v/v) of the anode off-gas is recycled to the anode chamber.

10. The process of claim 1, wherein the fuel gas contains at most 15% (v/v) nitrogen.

11. The process of claim 1, wherein the fuel gas contains at most 10% (v/v) nitrogen.

12. The process of claim 1, wherein the fuel gas contains substantially no nitrogen.

13. The process of claim 1, wherein the set point in carbon dioxide concentration at the cathode chamber outlet is in the range of from 10% to 30% (v/v).

14. The process of claim 1, wherein the external oxidant stream is substantially pure oxygen.

* * * * *